United States Patent

Beaulieu

Patent Number: 5,439,308
Date of Patent: Aug. 8, 1995

[54] CONNECTOR

[76] Inventor: Roland Beaulieu, P.O. Box 129, Tiverton, R.I. 02878

[21] Appl. No.: 219,035

[22] Filed: Mar. 28, 1994

[51] Int. Cl.6 .............................................. F16B 12/24
[52] U.S. Cl. ..................... 403/292; 403/267; 403/265; 403/403; 411/456; 411/477; 411/451
[58] Field of Search ............... 403/292, 266, 267, 403, 403/402, 297, 294; 411/456, 451, 460, 458, 477, 478

[56] References Cited

U.S. PATENT DOCUMENTS

| 419,763 | 1/1890 | Fletcher . | |
|---|---|---|---|
| 2,599,994 | 6/1952 | Hirsch | 403/292 |
| 3,214,802 | 11/1965 | Davis . | |
| 3,276,797 | 10/1966 | Humes | 411/458 X |
| 3,674,068 | 7/1972 | Lucci . | |
| 3,826,053 | 7/1974 | Cameron . | |
| 3,927,467 | 12/1975 | Schoeman . | |
| 4,373,829 | 2/1983 | Braxell | 403/267 |
| 4,509,294 | 4/1985 | Boilard . | |
| 5,125,442 | 6/1992 | Hendrickson . | |
| 5,174,676 | 12/1992 | Welsch et al. | 403/292 X |
| 5,259,686 | 11/1993 | Hatch | 403/292 X |

FOREIGN PATENT DOCUMENTS 191416 1/1923 United Kingdom ................. 403/292

Primary Examiner—Anthony Knight
Attorney, Agent, or Firm—Robert J. Doherty

[57] ABSTRACT

A device for connecting separate material pieces which are disposed in abutting relationship to each other and which includes a thin planar body having side portions adapted to respectively extend into open-ended slots provided on each of the abutting surfaces of the material pieces in which a pocket construction is provided for a stiffening member which is separate and apart from the device body.

14 Claims, 2 Drawing Sheets

CONNECTOR

BACKGROUND AND OBJECTS OF THE INVENTION

This invention relates to a device for connecting pieces of material such as wood, chip board and the like together by the introduction of the device into opposed slots formed in the butt edges or faces of such material pieces positioned adjacent to each other. Devices of this general type are known and often utilized to connect various wood components together such as the molding or framing strips forming the baseboard or surrounding door and window frames in modern house constructions. The present invention will be described with specific reference to such structures although it should be pointed out that the invention is not so limited and as, applicability in joining many structure types together including, for instance, picture frames and including constructions not necessarily formed from wood or wood products alone.

Various prior art constructions utilized or proposed to join material components together in this general manner include those disclosed in the following U.S. patents: U.S. Pat. No. 419,763 to Fletcher issued Jan. 21, 1890; U.S. Pat. No. 3,214,802 to Davis issued Nov. 2, 1965; U.S. Pat. No. 3,674,068 to Lucci issued Jul. 4, 1972; U.S. Pat. No. 3,826,053 to Cameron issued Jul. 30, 1974; U.S. Pat. No. 3,927,467 to Schoeman issued Dec. 23, 1975; U.S. Pat. No. 4,509,294 to Boilard issued Apr. 9, 1985; and U.S. Pat. No. 5,125,442 to Hendrickson issued Jun. 30, 1992.

It should be noted that some of the connectors disclosed in the above-indicated patents utilize some type of flat thin-walled member which is cooperatively disposed between opposed slots and held by the co-action of some frictional element such as barbs, teeth and the like in order to form the cooperative joint and thus hold the two material pieces together. In some of the patents, glue is additionally utilized to enhance the resultant joint; and one of the patents, that is, the patent to Schoeman, introduces a secondary element in the form of a dowel in order to provide enhanced frictional contact. In addition despite the proposals set forth in these patents, wood moldings such as baseboard and the casings of windows and doors in modern house constructions are more commonly fastened by finish nails set at angular relationship. Such most common fastening procedure often results in the partial and unsightly separation of the pieces or a splitting of the wood during such procedure and other undesirable effects.

Accordingly, a need still exists for the provision of a simple yet effective connector device which can be utilized to connect such material pieces together and which results in a neat even appearance which retains such configuration over time and yet which is structurally sound. These and other objects of the present invention are accomplished by the provision of a device for connecting separate material pieces between adjacent face to face edge surfaces of said pieces wherein each of said face to face edge surfaces is provided with an open end slot of substantially constant width inwardly extending into the respective piece, said device comprising a main member having a generally planar body which includes laterally opposed sides in turn provided with at least one outwardly extending tooth wherein said opposed sides are positioned in said slots with said teeth engaging the slot walls, said planar body further including an opening disposed laterally between said opposed body sides, said opening of a generally geometric configuration and defined by a plurality of adjacent side edges in turn forming a means for receipt of a generally planar stiffening member, said stiffening member separate from said main member.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DETAILED DESCRIPTION OF THE INVENTION

Figure 1:
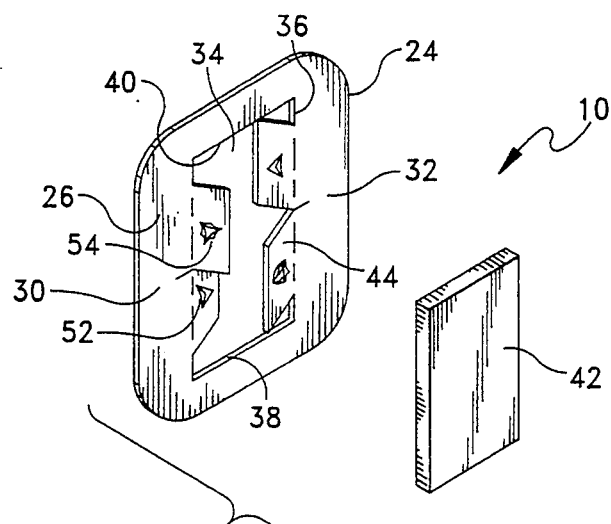
FIG 1. is an exploded perspective view of one form of the connector of the present invention.
Figure 2:
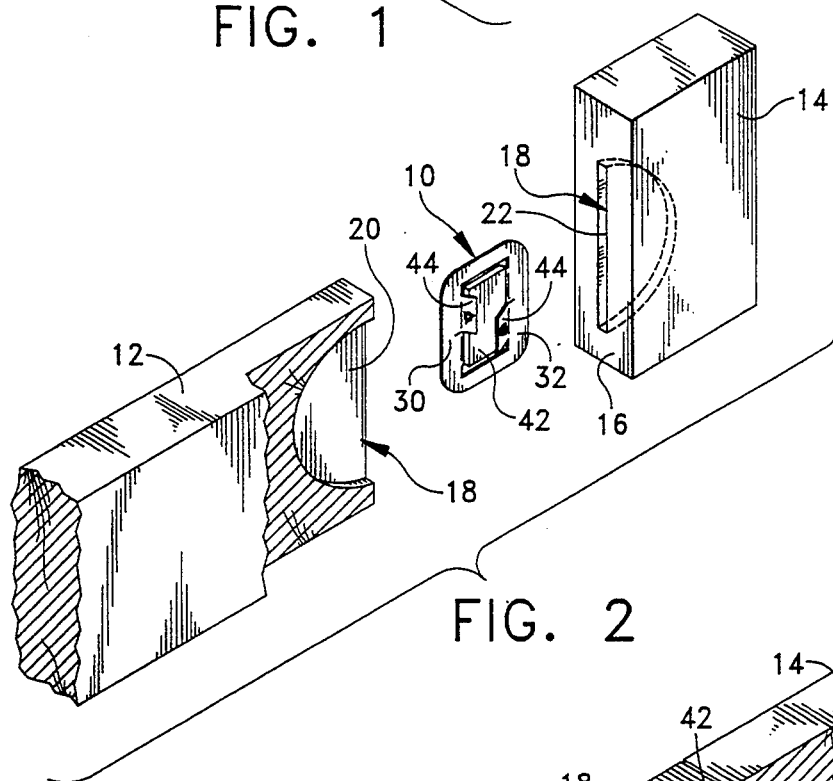
FIG. 2 is an exploded perspective view of the connector of FIG. 1 shown ready to be assembled with material pieces of wood.
Figure 3:
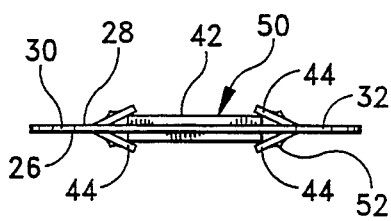
FIG. 3 is a top plan view of the assembled connector.
Figure 4:
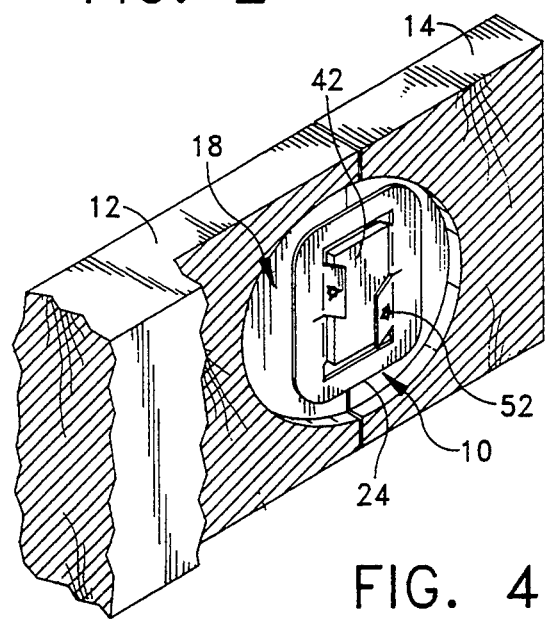
FIG. 4 is a perspective view with parts broken away for clarity showing the connector and the connected pieces.

Referring now to the drawings and particularly FIGS. 1 through 4 thereof, one form of the device forming the present invention is depicted. Such device 10 is utilized to connect two material pieces 12 and 14 together. Such pieces 12, 14 may be sections of longitudinally oriented baseboard molding formed from wood but such example is for illustrative purposes only and both the material and the angular relationship at which the pieces 12 and 14 are disposed can vary widely. Each of the pieces 12, 14 includes an edge surface 16 which surfaces are adapted for face to face contact with each other. In addition, each surface 16 is provided with an open end slot 18 defined by opposed walls 20 and 22. The slots 18 may be aligned in any angular respect with regard to the material pieces 12 and 14 with a vertical orientation shown in the drawings for purposes of illustration. The slots 18 are generally of equal thickness and may be formed by standard routing techniques in which case they would be circular as depicted or can be formed by other methods and take other geometric configurations when viewed in a direction of right angles to their planar extent—the important feature of the slots being that they can be aligned with each other and that they each receive a portion of the device 10 which, in effect, extends therebetween and effects a tight joint between the material pieces 12, 14 when the faces 16 thereof are in abutting relationship in a manner which will hereinafter be more fully brought out.

The device 10 includes a body 24 of thin walled generally planar configuration and formed of a suitably stiff yet flexible material such as metal or plastic. The body 24 includes an inner face surface 26 and an outer face surface 28 as well as lateral side portions 30 and 32. An opening 34 disposed generally centrally of the body 24 is provided and defined by a pair of lateral side edges 36 as well as top and bottom edges 38 and 40 adjacent thereto. Generally the opening 34 is of rectangular configuration but can assume other configurations—the primary feature of such opening being its ability to at least in part provide the means by which a stiffening member 42 may be held in relationship to the body 24.

Figure 5:
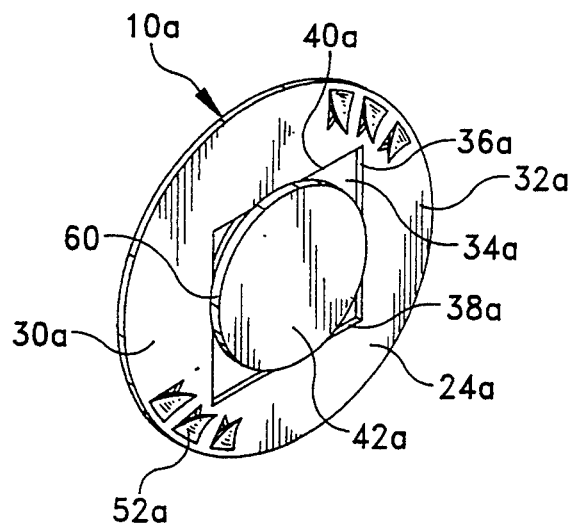
FIG. 5 is a perspective view of another form of the connector of the present invention.
Figure 6:
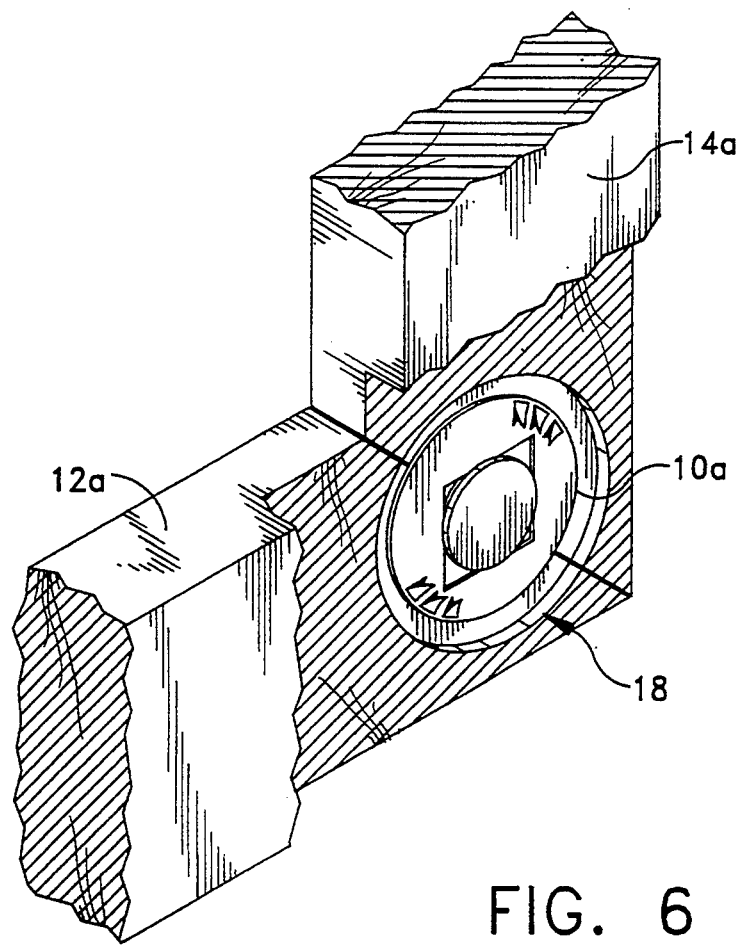
FIG. 6 is a perspective view with parts broken away for clarity showing the connector and the connected pieces.

The opposed side edges 36 are further provided with fingers or flaps 44 which laterally extend inwardly towards each other and into confines of the opening 34. Two pairs of such fingers 44 are shown in the drawings with the diagonally opposed sets thereof respectively forwardly and rearwardly disposed out of the plane formed by the body 24 with respect thereto. Generally the fingers 44 are formed from the same material forming the body 24 as by cutting and bending and are of a combined lateral width substantially less than the width of the opening 34 such that the stiffening member 42 may be easily received by the pocket 50 formed by the co-action of the fingers 44 and the edges 36 and to some extent, the edges 38 and 40. Alternatively, the fingers 44 need, not be necessarily angled forwardly and rearwardly with respect to the plane formed by the body 24 of the device 10 but could be angled in one such direction only, as long as the necessary pocket 50 configuration is defined to the extent necessary to accept the stiffening member 42. Also, the opening 34 need not be a complete discrete opening of regular geometric configuration but may and does for definitive purposes in this application include separate or interconnected openings such as those in superposed relationship with the fingers and take the form of a recess therein which is also included in the word 'opening' for purposes of this application. Also, only one finger on either lateral side of the opening need be present or even only a total of one finger if adequate to form the pocket or otherwise hold the stiffening member. Also as shown in FIGS. 5 and 6, forms in which no actual fingers are present are possible.

Each of the fingers 44 further preferably includes a tooth or protuberance 52 preferably integrally formed in the finger and including a pointed end 54 generally laterally aligned and with such points of opposite fingers 44 directed towards each other such that when the sides 30 and 32 of the device 10 are disposed within the cooperating slots 18, the points or barbs 54 tend not to bite into the opposed surfaces 18, 20 until the full positioning of the device 10 takes place, that is, until the faces 16 of the material pieces 12 and 14 abut, as is normally desired. Although it is preferable to place such teeth 52 on the fingers 44 since they represent that portion of the device 10 which is disposed more forwardly or rearwardly with respect to the body 24 and thus is more intimate contact with the slot walls 20, 22, they could alternatively be placed on the side portions 30, 32 of the body 24 so long as the needed contact between the slot walls or wall was brought about.

The stiffening member 42 is formed of a geometric configuration to be readily accommodated by that of the cooperatively formed pocket and is preferably made of a material the same or similar to that from which the material pieces 12 and 14 are formed, i.e., wood, and is preferably of a thickness substantially greater than that of the body 24 but equal to or slightly less than that of the thickness of the slots 18 such that the cooperative structure of the body 24 and the stiffening member 42 comprising the device 10 can be positioned within the respective slots 18. The stiffening member 42 is adapted for disposition within the confines of the opening 34 and adapted to underlie the fingers 42 so that the above described desired effect of the barbs 52 is available.

In this way then, the device 10 can be be simultaneously inserted into slots 18 by forcing the pieces 12 and 14 together with respect to the device 10 or initially one side of the device 10 may be inserted into one of the slots 18 and then the remaining piece (normally that which is not already affixed to the wall) frictionally forced over the remaining opposite side of the device. In this position, the body 24, of the device including the barbs 52 tend to hold the material pieces 12, 14 against longitudinal separation while the stiffening member adds rigidity to the overall assembly such that the pieces 12 and 14 do not tend to otherwise twist or creep or longitudinally separate over time. Preferably, the front and rear surfaces of the stiffening member 42 are coated with a glue or the slots 18 previously provided with a suitable amount of glue such that an addition to the above described connecting features imparted by the body 24 of the device that a more rigid and solid connection will be formed similar to a mortise and tenon joint. Also, the flexibility of the body 24 and its ability to hold the material pieces together further enables the glue to set up while the pieces are properly aligned.

Turning now to FIGS. 5 and 6 of the drawings, a modified form of the device 10a is depicted wherein the overall geometric configuration of the body 24 thereof is circular and the opening 34a rectangular or square and defined by cooperating edges 36a, 38a and 40a and there being no fingers or flaps equivalent to those depicted in FIG. 1 through 4 of the drawings. Generally in this form of the invention, the stiffening member 42a is circular in configuration and presents circumferential edge surfaces 60 which are adapted to frictionally engage the edge surfaces 36a, 38a and 40a which cooperatively form a pocket for receipt thereof. Additionally if desired, the surface 60 could be provided with a groove (not shown) into which the edges forming the pocket in this configuration could better engage. Also as with the previous embodiment, the stiffening member 42a is of a substantially greater thickness than the body 24a and may be utilized with or without adhesive to achieve the desired effects previously indicated. In the embodiment shown in FIGS. 5 and 6, it should also be pointed out that the teeth 52a are disposed on lateral side portions 30a and 32a; and as previously indicated, there may be one or more of such teeth 52a to provide the overall effect. Also as shown in FIG. 6, the device 10 may be utilized to join pieces 12a and 14a which are disposed in an angular relationship to each other rather than the longitudinal relationship utilized in the explanation of the previous embodiment.

While there is shown and described herein certain specific structure embodying this invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A device for connecting separate material pieces between adjacent face to face edge surfaces of said pieces wherein each of said face to face edge surfaces is provided with an open end slot of substantially constant width inwardly extending into the respective piece, said device comprising a main member having a generally planar body which includes laterally opposed sides in turn provided with at least one outwardly extending tooth wherein said opposed sides are positioned in said slots with said teeth engaging the slot walls, said planar body further including an opening disposed laterally between said opposed body sides, said opening of a generally geometric configuration and defined by a plurality of adjacent side edges in turn forming a means for receipt of a generally planar stiffening member, said stiffening member separate from said main member.

2. The device of claim 1, said means for receipt of a stiffening member being a pocket cooperatively formed by said opening and fingers which extend into said opening from said side edges.

3. The device of claim 2, said fingers inwardly extending towards each other into said opening from laterally opposed side edges with one of said fingers upwardly angled from the plane defined by said body and the other of said fingers downwardly angled from the plane defined by said body.

4. The device of claim 3, there being a pair of fingers on each of said laterally opposed edges wherein diagonally opposed sets of said fingers are respectively upwardly and downwardly angled from the plane defined by said body.

5. The device of claim 2, wherein said teeth are provided on said fingers.

6. The device of claim 1, there being a plurality of said teeth on each opposed side of said body.

7. The device of claim 1, said stiffening member being of a greater material thickness than said body and of a lesser material thickness than the width of said slots.

8. The device of claim 1, said material pieces being formed of wood and said stiffening member also being formed of wood.

9. The device of claim 1, said body opening and said stiffening member extending between said opposed slots.

10. The device of claim 1, said body being flexible and said stiffening member being rigid.

11. The device of claim 10, said body formed of metal sheet material.

12. The device of claim 8 wherein said stiffening member is glued to opposed sides of said slots.

13. The device of claim 5, said teeth integral with said fingers.

14. The device of claim 6, said teeth integral with said body.

* * * * *